July 5, 1932.  A. OLDENBURG  1,866,368
ELECTRIC TOOL
Filed May 31, 1930
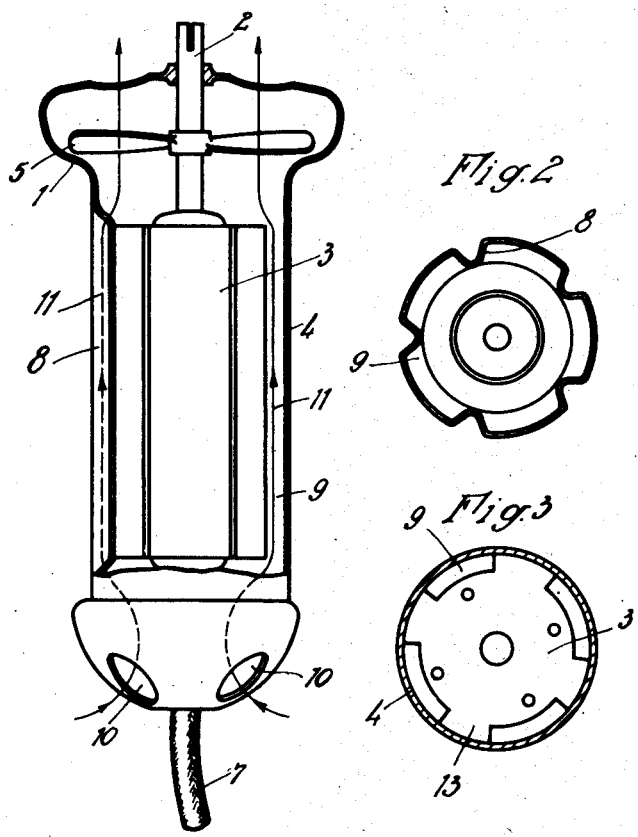
INVENTOR
Alfred Oldenburg.
BY
ATTORNEY

UNITED STATES PATENT OFFICE

ALFRED OLDENBURG, OF BERLIN-CHARLOTTENBURG, GERMANY, ASSIGNOR TO WESTINGHOUSE ELECTRIC & MANUFACTURING COMPANY, A CORPORATION OF PENNSYLVANIA

ELECTRIC TOOL

Application filed May 31, 1930, Serial No. 458,017, and in Germany June 6, 1929.

My invention relates to electric tools and particularly to portable motor driven tools.

For driving electric tools or apparatus, for instance, hair cutting machines, massaging apparatus, polishing machines, drilling machines, hair dryers or other implements of similar kind, often, motors of the so-called built-in type are used, which are built directly into the apparatus. When built directly into the machines, it is, however, necessary for the motors to be particularly well cooled, as, being completely enclosed, they would otherwise become too hot when in continuous operation for a length of time. The constructions hitherto known were, however, not so designed as to obtain a sufficient cooling.

According to the present invention, the electric motor built into the hand apparatus is particularly well cooled by channels for the air being left free between the stator laminations of the motor and the inside surface of the casing. Through these channels the air drawn in from the outside by a fan, mounted on the motor shaft, can pass, and consequently the heat developed in the motor, is well taken away. Owing to the cooling of the rotor laminations of the motor produced by this means, the motor may be built directly into a portion of the machine adapted to be held in the operator's hand since the motor is well cooled in spite of the small inside diameter of the casing. Besides, the casing portion in the operator's hand is thereby kept cooled so that the machine is very convenient and easy to manipulate, even, if the motor should after having been in operation for a long time become gradually hotter.

A particularly good arrangement of the air channels consists in providing a ring-shaped hollow space between the back of the rotor of the motor and the casing. To maintain the distance between the motor and the casing, ribs may be arranged on the inner side of the casing. It is also possible to provide the back of the stator of the motor with projections extending to the inner surface of the casing, said projections also serving to center the motor.

In the single sheet of drawing:

Figure 1 is a view, partly in longitudinal section and partly in side elevation, of device embodying my invention, Fig. 2 is a view in lateral section therethrough, and Fig. 3 is a view, in lateral section, through a modified form of device embodying my invention.

1 is the casing of an electric apparatus adapted to be held in the hand of an operator, for instance, of an apparatus for massaging or a small polishing or other machine, to the rotor shaft 2 of which a massaging implement, a polishing disk, a drill or other similar appliance (not shown) may be connected; the shaft being driven by the motor 3. The motor 3 is located in the handle portion 4 of the machine and quite enclosed in same. The motor 3 may be connected to a supply circuit by means of the lead 7, and has an outer diameter which is smaller than the inside diameter of the portion 4 of the casing. The indented ribs or corrugations 8 provided in the portion 4 hold, as shown in the sectional view, Fig. 2, the motor in such a manner that its axis and that of the handle coincide approximately and leave a ring-shaped hollow space 9 free between the laminations of the motor and the handle. On the motor shaft 2 is mounted a fan 5, which sucks in the outside air through the openings at the bottom end of the portion 4, and draws it in direction of the arrows 11 through the ring-shaped hollow space 9.

The laminations of the motor and the portion 4 are thereby very intensively cooled, so that the machine may be held in one's hand for any length of time without causing any inconvenience from the heat produced by the motor.

The packet of stator laminations of the motor may also, as shown in the sectional view, Fig. 3, be provided with several radial projections 13, extending to the inside surface of the substantially cylindrical casing 4a and serving to center the motor therein. With this arrangement the projections 13 also leave channels 9 open for the cooling air between the inside surface of the portion 4a and the packet of stator laminations of the motor so that a sufficient cooling of the motor and the handle is obtained.

Instead of for electric hand apparatus, the built-in motor according to the present invention may also be employed for any other purposes, for instance, for being built into vacuum cleaners, table fans or other small machines. It is also without difficulty possible to design the motor according to the present invention for larger outputs and to build it into working machines.

I claim as my invention:

1. In a portable tool, a motor casing of a size adapted to be held in the hand of an operator, openings at each end of the casing, and a plurality of axially-extending indented ribs in said casing, a motor structure held in the casing by the indented ribs, and a fan on the motor shaft for moving air in substantially axially straight paths through said openings and between the casing and the motor structure when the motor is operating.

2. In a portable tool, a motor casing of a size adapted to be held in the hand of an operator, openings at each axial end of the casing, said casing having a plurality of axially and inwardly-extending corrugations therein, a motor structure held in the casing by contact with the inwardly-extending corrugations and a fan actuated by the motor to draw air into the casing at one end, past the motor structure and out of the casing at the other end thereof in substantially straight axial paths.

3. In an electric tool a casing of the type adapted to be held in the hand of an operator and having a plurality of relatively narrow inwardly-extending corrugations, end shield bearing brackets at the two ends of the casing having openings therethrough, a motor structure in the casing including a stator engaging the corrugations of the casing and held thereby in proper operative position, a rotor and a rotor shaft supported by the end shield bearing brackets, a fan on the rotor shaft for forcing air through the end shield bearing brackets and the casing.

4. An electric tool including a casing of relatively thin material and of a type to be held in the hand of an operator and having a plurality of relatively narrow longitudinal inwardly-extending corrugations, end shield bearing brackets at the ends of the casing having air inlet and outlet openings therein, a motor structure in the casing including a stator held in the casing by the corrugations, a rotor and a rotor shaft supported by the end shield bearing brackets and a fan on the rotor shaft for forcing air through the casing.

In testimony whereof I affix my signature.

ALFRED OLDENBURG.